No. 642,242. Patented Jan. 30, 1900.
J. W. MILLER.
SIDE BRACE FOR SHAFTING.
(Application filed Sept. 23, 1899.)
(No Model.)
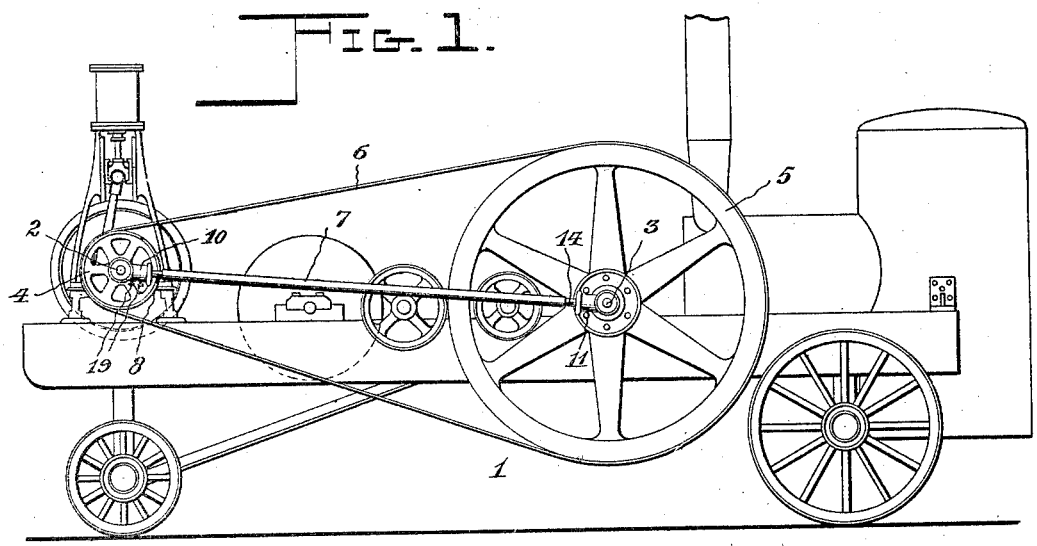
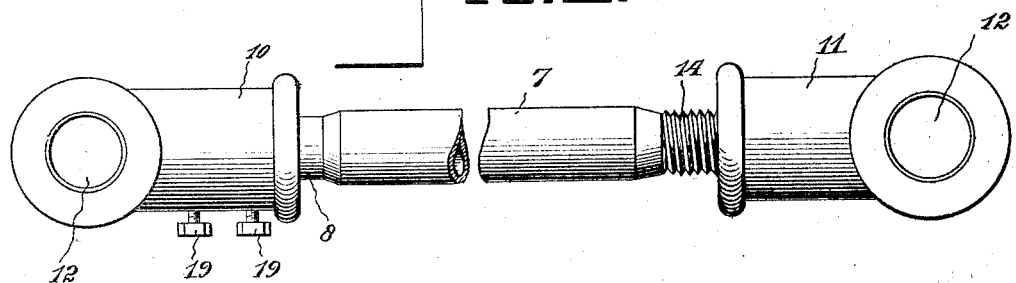
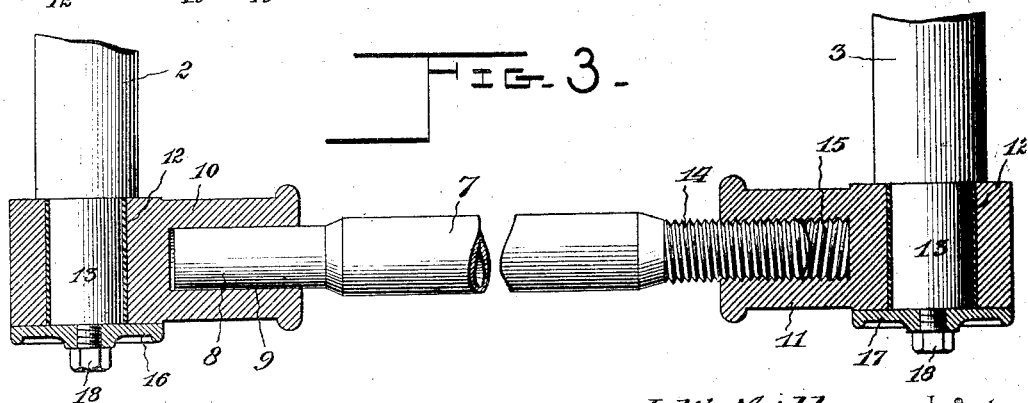
Witnesses
J. W. Miller, Inventor
By his Attorneys,

UNITED STATES PATENT OFFICE.

JOHN W. MILLER, OF AKRON, OHIO.

SIDE BRACE FOR SHAFTING.

SPECIFICATION forming part of Letters Patent No. 642,242, dated January 30, 1900.

Application filed September 23, 1899. Serial No. 731,440. (No model.)

*To all whom it may concern:*

Be it known that I, JOHN W. MILLER, a citizen of the United States, residing at Akron, in the county of Summit and State of Ohio, have invented a new and useful Side Brace for Shafting, of which the following is a specification.

My invention relates to improvements in side braces for shafts employed for drills or in any other connection, and has for one object the production of a simple, durable, and inexpensive brace for connecting the ends of parallel shafts and designed to oppose resistance to side strain.

A further object of the invention is to provide simple means for effecting the longitudinal adjustment or extension of the brace.

Referring to the drawings, Figure 1 is an elevation of a portable machine comprising two shafts with my brace applied. Fig. 2 is a similar view of the brace detached and having a portion broken out in order to accommodate the view on a large scale; and Fig. 3 is an elevation showing the ends of two shafts and my brace applied, the bearing members being shown in section.

Referring to the numerals of reference on the drawings, designating corresponding parts throughout the several views, 1 indicates a portable machine of ordinary form, comprising the engine-shaft 2 and the flywheel shaft 3, upon which are keyed the wheels 4 and 5, geared together, as by a belt 6. These shafts are ordinarily at some distance apart, and being connected by gearing of some form the side strains upon the shafts are considerable. It is for the purpose of resisting these strains and of solidly bracing the shafts that I have provided my novel adjustable brace 7, one end 8 of which is reduced and slides freely within a smooth socket 9 in one of two bearing members 10 and 11, each of which is provided with an opening 12 for the reception of the reduced ends 13 of the shafts 2 and 3. The end 14 of the brace 7 is also reduced and is screw-threaded to fit within a screw-threaded socket 15 in the bearing member 11.

16 and 17 indicate bearing-caps of larger diameter than the ends 13 of the shafts and secured against the outer end faces of the shafts and the contiguous faces of the bearing members by screw-bolts 18, passing through the caps and into the shafts.

In operation, the side braces being mounted as indicated in Fig. 1 of the drawings, the distances between the bearing members may be regulated or adjusted by rotating the threaded ends 14 in the sockets 15 in an obvious manner, the opposite smooth end 8 of the brace revolving in its socket 9, against the bottom of which it finds an abutment.

Any suitable means for locking the brace against rotation to prevent the accidental derangement of its adjustment may be provided; but I prefer to employ one or more set-screws 19, passed through the wall of the socket 9 and designed to bear against and fix the brace within the socket.

What I claim is—

1. A side brace for shafts comprising end members having bearings therein, and provided with sockets in the end members adapted for alinement, and a rod disposed loosely in one of the sockets at one end and having its opposite end in threaded engagement with the other socket.

2. A side brace for shafts comprising end members having bearings therein, and provided with sockets in the end members, one of said sockets having threads, a rod having a threaded end engaging the threads of one of the sockets and having a smooth end disposed loosely in the other socket, and set-screws carried by one of the end pieces and adapted for engagement with the rod to hold it against movement with respect thereto.

In testimony that I claim the foregoing as my own I have hereto affixed my signature in the presence of two witnesses.

JOHN W. MILLER.

Witnesses:
H. A. HINE,
H. W. COLE.